H. R. ELLIS.
PROCESS OF EXTRACTING COPPER FROM CARBONATE AND OXID ORES.
APPLICATION FILED JUNE 4, 1914.
1,115,521.
Patented Nov. 3, 1914.
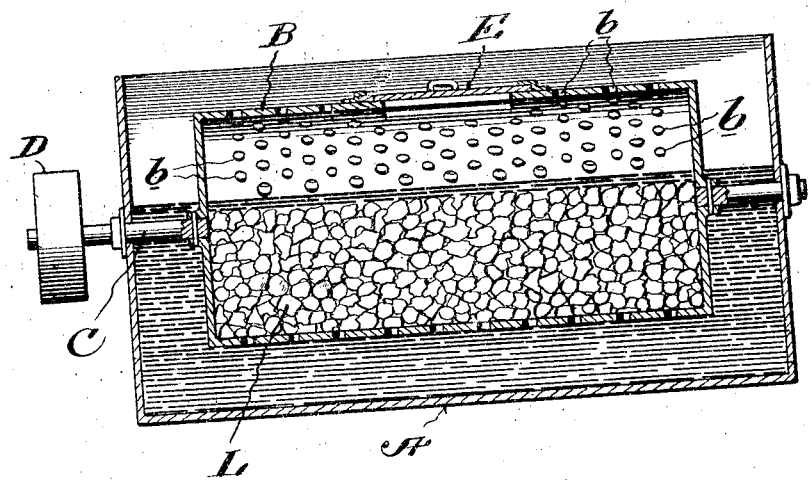
Witnesses
Inventor
Henry R. Ellis
By
Attorney

UNITED STATES PATENT OFFICE.

HENRY R. ELLIS, OF SALT LAKE CITY, UTAH.

PROCESS OF EXTRACTING COPPER FROM CARBONATE AND OXID ORES.

1,115,521.  Specification of Letters Patent.  Patented Nov. 3, 1914.

Application filed June 4, 1914. Serial No. 842,941.

*To all whom it may concern:*

Be it known that I, HENRY R. ELLIS, a citizen of the United States, residing at Salt Lake City, in the county of Salt Lake and State of Utah, have invented certain new and useful Improvements in Processes of Extracting Copper from Carbonate and Oxid Ores, of which the following is a specification.

In the patent granted me April 14, 1903, No. 725,548, I have described and claimed a process for the extraction of copper from its carbonate and oxid ores, in which I employed, as a solvent, an aqueous solution containing carbonate or bicarbonate of sodium or potassium, or mixtures of the same, and from which the copper, in metallic form, was extracted by electrolysis or as a sulfid.

My present invention consists in treating the above named solutions by small pieces of metallic lead for the purpose of precipitating the copper and preferably maintaining the small pieces of lead in a condition of agitation with frictional contact of the particles, as hereinafter more fully described with reference to the drawing, in which the figure is a vertical longitudinal section of a simple form of apparatus for carrying out the process.

In the drawing, A is the tank composed of any material capable of resisting the attack of the solution.

B is a horizontal tumbling barrel of similar resisting quality arranged on a horizontal shaft C within the side walls of the tank and provided with a pulley D for its slow revolution.

The tumbling barrel is provided with a sliding door E, through which the small pieces of lead L are introduced, and the sides of this tumbling barrel are perforated with holes *b*. Within the tank A is placed the solution containing the copper formed by the action of the alkaline carbonate solution on the carbonate and oxid ores of copper; this solution being made to completely submerge the lead in the barrel B. The barrel is then slowly rotated with the pieces of lead immersed in the solution.

The lead may be used in the form of pellets or small bars, or other small particles, in which the lead particles are capable of rubbing against each other with an erosive and abrasive or frictional action. The copper, in metallic form, precipitates upon the lead and is rubbed off by the frictional action of the lead particles rubbing against each other. The copper, being in a fine state of subdivision, passes out of the barrel through the perforations, as does also the carbonate of lead formed in the reaction. The copper and the carbonate of lead are filtered or settled out of the solution and the solution returned to the ore for a further extraction of copper and the precipitating process is gone through with again.

The metallic copper and the lead carbonate precipitate may be washed to free the copper of the lead carbonate. This may be effected in various ways. One of them is to agitate the precipitate with water, and, as the settling velocity of the copper is greater than that of the lead carbonate, the copper goes to the bottom and the carbonate of lead remains in suspension. The water is drawn off and the carbonate of lead with it. After this separation, the lead carbonate is separated from the water and heated with carbon, or other reducing agent, to reduce it to metallic lead, and then be used over again; or the mixed precipitate of metallic copper and lead carbonate may be melted and the oxid of lead, which is formed on top, is skimmed off and then reduced to metallic lead and used over again. The precipitation may be completely carried out in one tank containing the barrel or in a series of them, the solution flowing from one tank to the next till finished in the last tank.

Another way to use the metallic lead to precipitate the copper is to use it in the form of dust and then agitate the copper charged solution with the lead dust in suspension, much in the same way that zinc dust is used with cyanid solutions. The precipitate of metallic copper and lead carbonate is filtered or settled out, the lead carbonate separated from the copper as mentioned above, the lead carbonate or oxid reduced to metallic lead and converted into dust and used over again to precipitate the copper.

What I claim is:

1. The process of extracting and recovering copper from its carbonate or oxid ores or from materials containing the carbonates or oxids of copper, which consists in subjecting such ores or materials to the action of a solution containing an alkaline carbonate or bicarbonate as described, separating the copper charged solution from such ores or materials and precipitating the copper from such solution by means of metallic lead.

2. The process of extracting and recovering copper from its carbonate and oxid ores or from materials containing the carbonates or oxids of copper which consists of treating such ores with a solution containing an alkaline carbonate or bicarbonate as described, separating the copper charged solution from such ores or materials and precipitating the copper from such solutions by means of finely divided metallic lead, substantially as described.

3. The process of extracting and recovering copper from its carbonate and oxid ores, or from materials containing the carbonates or oxids of copper, which consists of treating such ores with a solution containing an alkaline carbonate or bicarbonate as described, separating the copper charged solution from such ores or materials, precipitating the copper from such solutions by means of finely divided metallic lead and maintaining the lead particles in a condition of frictional agitation against each other, substantially as described.

In testimony whereof I affix my signature in presence of two witnesses.

HENRY R. ELLIS.

Witnesses:
GEORGE F. WASSON.
A. C. ELLIS, Jr.